Patented Mar. 3, 1942

2,274,717

UNITED STATES PATENT OFFICE 2,274,717

AZO DERIVATIVES OF CARBOXYLIC ACID AMIDES AND METHOD OF MAKING

Chauncey Allan Lyford, Elma, N. Y., assignor to Allied Chemical & Dye Corporation, a corporation of New York No Drawing. Application August 9, 1939,
Serial No. 289,210

10 Claims. (Cl. 260—199)

The present invention relates to new chemical compounds and their manufacture. In particular the invention is directed to azo compounds obtainable by diazotization and coupling of the amines described and claimed in my United States patent application Serial No. 274,835, filed May 20, 1939.

That application relates to mono-arylamides of polycarboxylic acids wherein the carboxyl groups are mutually joined by a carbon to carbon linkage, i. e. a single bond or a hydrocarbon residue, and wherein a primary amino group and a sulfonamide group are present as nuclear substituents in the arylamine residue.

The compounds of the present invention differ from the compounds of my prior application in that they contain, in place of the primary amino group referred to in the preceding sentence, an azo radical.

The products of the present invention in which the azo radical consists of an —N=N—R group, R representing the residue of an azo dyestuff coupling component of the benzene, naphthalene, anthracene, or pyrazolone series, are valuable dyestuffs. They also are valuable as intermediates for the preparation of amino aryl azo compounds. Acidic dyestuffs of the present invention, especially those in which the azo coupling component residue, represented by R, is the residue of a naphthylamine sulfonic acid or of an amino-naphthol sulfonic acid, are particularly applicable to the dyeing of animal fibers.

The invention is concerned primarily with the monoazo dyestuffs obtainable by diazotization and coupling of the dicarboxylic acid monoanilides represented by the following general formula:

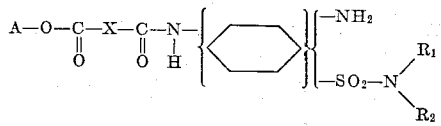

wherein A represents hydrogen or a water-soluble, salt-forming metal or group such as sodium, potassium, ammonium, etc.; X represents a carbon to carbon linkage, i. e. a single bond, or a hydrocarbon residue, substituted or unsubstituted, especially the residue of a dicarboxylic acid which is capable of forming an inner anhydride; and $R_1$ and $R_2$, which may be similar or dissimilar, represent hydrogen or substituted or unsubstituted alkyl, aralkyl, aryl, or cyclo-alkyl radicals. If $R_1$ or $R_2$ is a substituted alkyl or cyclo-alkyl radical, it may contain as substituents such groups as —OH, —O—$SO_3H$, or —$SO_3H$. If $R_1$ or $R_2$ is a substituted aryl radical, it may be substituted, for instance, by alkyl, hydroxy, alkoxy, halogen, or nitro groups. The benzene ring of the formula may contain similar substituents.

The mono-azo dyestuffs of the present invention may be represented by the following general formula:

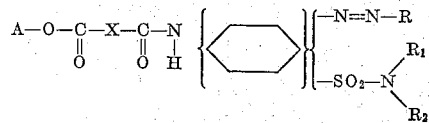

wherein R represents the residue of an azo dyestuff coupling component, and A, X, $R_1$, and $R_2$ have the same significance as hereinbefore defined.

Examples of suitable polycarboxylic acids, the residues of which may be represented by A—O—CO—X—CO— in the foregoing formulas, are maleic acid, succinic acid, tartaric acid, primary or secondary amino-succinic acids, phthalic acid, naphthalic acid, oxalic acid, adipic acid, and methyl glutaric acid. Especially suitable residues are those of inner-anhydride-forming acids: maleic, succinic, and phthalic acids.

The preferred products of the present invention are the dicarboxylic acid mono-anilides which contain, as nuclear substituents of the aniline residue, an azo group in the para position and, in the meta position, a sulfonamide group the two hydrogens of which are replaced by an alkyl group, and an aryl group of the benzene or naphthalene series, respectively. If substituted, the alkyl group of the sulfonamide radical may contain as substituents, for example, hydroxy, sulfo, or sulfato groups, and the aryl residue of the said radical may be substituted, for example, by alkyl, hydroxy, alkoxy, halogen, or nitro groups.

In the preferred mono-azo dyestuffs of the present invention, the coupling component residue, which is represented in the foregoing formula by R, is the residue of a sulfonic acid of a beta-amino-naphthalene, and the azo linkage is joined to the naphthalene nucleus in the alpha position adjacent to the beta-amino group. The said preferred mono-azo dyestuffs of the present invention dye animal fibers, particularly wool, in level brown to red to violet to blue shades of unusual fastness to light.

In preparing the products of the present invention from the dicarboxylic acid mono-arylamides of my prior application, the nuclear amino group thereof may be diazotized with the calculated quantity or a slight excess of nitrite and a mineral acid, such as hydrochloric acid. In carrying out the diazotization, a finely divided slurry of the amine in water may be treated with the nitrite and acid in the usual way; but preferably the amine is first dissolved in a dilute aqueous solution of sodium carbonate, a stoichiometric amount of nitrite or a slight excess is added, and the resulting solution is then added gradually to a mixture of ice and hydrochloric acid. The resulting diazonium chloride may be salted out by saturating the solution with common salt and may be separated as a cake by filtration.

Mono-azo compounds may be produced from the resulting diazo compound by coupling in the usual manner with suitable azo coupling components. Polyazo compounds, i. e. compounds containing two or more azo groups, may be produced from the diazo compound by coupling in the usual manner with suitable azo coupling components which contain at least one diazotizable amino group, diazotizing the product, and coupling with an azo coupling component, which may or may not contain diazotizable amino groups, and so on.

In preparing the aforesaid mono-azo compounds, the temperature in the coupling step may be raised, if necessary, for example to about 70° C., to facilitate the reaction. The coupling may also be aided by addition of alcohol or a similar water-miscible solvent to the reaction mixture in amounts sufficient to yield a concentration between say about 10% and 30% by weight. The dyestuffs, in the form of their sodium salts, may be isolated from the reaction solution by salting out with common salt, filtering, and drying the filter cake. For the preparation of mono-azo dyestuffs of beta-amino-naphthalene-sulfonic acids or beta-amino-naphthol-sulfonic acids, it is preferred to effect the coupling in dilute aqueous acetic acid solutions or in the presence of a similar weakly acid aqueous medium.

The dicarboxylic-acid-mono-amide residue of the azo compounds described above may be saponified by treatment with aqueous alkali, for example by heating in an aqueous 5% NaOH solution, whereby the dicarboxylic acid group is severed and an unsubstituted amino group remains in the position formerly occupied by the dicarboxylic acid amide group. Good yields of amino-substituted azo products of relatively high purity are thus obtainable, from which, by diazotization and coupling, the corresponding polyazo compounds may be prepared.

The following examples illustrate the preparation of the products of the present invention.

*Example 1.*—4-(2'-amino-8'-naphthol-6'-sulfonic acid - 1' - azo) - succinanilic acid-3-sulfon(-N-ethyl-anilide)

39.1 grams of 4-amino-succinanilic-acid - 3 - sulfon-(N-ethyl-anilide) are mixed with about 480 cc. of an aqueous sodium carbonate solution containing about 8.8 grams of sodium carbonate, and the mixture is heated to 50° C. The amine is thereby dissolved. 72 cc. of an aqueous 10% sodium nitrite solution are added, and the mixture is poured into an iced solution containing 40 cc. of 20° Bé. hydrochloric acid and 180 grams of common salt. After agitating the resulting mixture at 0° C. to 5° C. for 15 minutes, 180 grams of sodium chloride are added and agitation is continued for 2½ hours at a temperature between 0° C. and 5° C. At the end of this period a somewhat tarry precipitate of the diazonium chloride has formed. It is separated from the aqueous reaction solution by filtration and slurried with 80 cc. of denatured alcohol. The resulting alcoholic slurry is added to a solution prepared by dissolving 26 grams of 2-amino-8-naphthol-6-sulfonic acid of 93% purity in 100 grams of water to which 44 cc. of an aqueous 10% sodium carbonate solution have been added, acidifying the solution with 2 cc. of glacial acetic acid, and adjusting the temperature to 20° C. The resulting coupling mixture is stirred for about 18 hours at a temperature between about 20° C. and about 30° C. A slight excess of gamma acid is present. The temperature is then raised to between 65° C. and 70° C. and agitation is continued at this temperature for 2 hours. The mixture is then cooled to about 35° C. and diluted with water to a total volume of 1200 cc. 200 cc. of aqueous 10% sodium carbonate solution are added to render the mixture slightly alkaline. 200 grams of sodium chloride are then added. The dyestuff is first precipitated as a tarry mass which later becomes crystalline. After its separation from the solution by filtration in the form of a filter cake, the dyestuff is dried. Its probable formula is as follows:

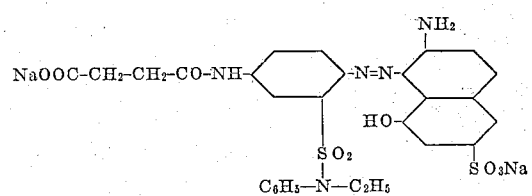

The yield is 62 grams or 90.5% of the theoretical yield based upon the amount of the diazo component.

The dyestuff is a dark brown-red powder which dyes wool in level red shades which are fast to light.

Dyestuffs are also produced by coupling the diazo component of the foregoing example with coupling components other than gamma acid. The following table indicates the constitution and shade of some of the resulting dyestuffs.

Dyestuffs (a) to (e) are primarily acid wool dyes; (f) is primarily a direct cotton dye.

shades which are somewhat more bluish than those produced by the corresponding succinyl

| | Coupling components and treatment | | | Shade |
|---|---|---|---|---|
| | First | Second | | |
| (a) | 1-p-toluene sulfonylamino-8-naphthol-3,6-disulfonic acid (alkaline coupling). | | | Bluish red. |
| (b) | 1-(4'-sulfo-2',5'-dichlorphenyl)-3-methyl-5-pyrazolone (alkaline coupling). | | | Yellow. |
| (c) | 1,7-naphthylamine sulfonic acid (acid coupling). | 1,8-amino-naphthol-2,4-disulfonic acid (alkaline coupling). | | Bluish black. |
| (d) | 1,7-naphthylamine sulfonic acid (acid coupling). | 2-phenylamino-5-naphthol-7-sulfonic acid (alkaline coupling). | | Bluish violet. |
| (e) | 1-amino-2-ethoxy naphthalene-6-sulfonic acid (acid coupling). | phenol (alkaline coupling). | Phenolic OH group esterified by means of p-toluene sulfonyl chloride. | Brown. |
| (f) | 1,7-naphthylamine sulfonic acid (acid coupling). | 1-amino-2-ethoxy-naphthalene-6-sulfonic acid (acid coupling). | 5,5'-dihydroxy-2,2'-dinaphthyl urea-7,7'-disulfonic acid (½ mol/mol of diazo compound) alkaline coupling). | Gray. |

*Example 2.*—4-(2'-amino-8'-naphthol-6'-sulfonic acid-1'-azo)-maleanilic acid-3-sulfon(-N-ethyl-anilide)

9.7 grams of 4-amino-maleanilic acid-3-sulfon-(N-ethyl-anilide) prepared as described in Example 3 of my application Serial No. 274,835 are dissolved in about 118 cc. of an aqueous sodium carbonate solution containing about 2 grams of sodium carbonate. 18 cc. of an aqueous 10% sodium nitrite solution are added to the slightly alkaline mixture. The resulting solution is added to a mixture of ice and 10 cc. of 20° Bé. hydrochloric acid. The diazotization mixture, which contains a slight excess of nitrite, is agitated at a temperature between 0° C. and 5° C. for 2½ hours. 140 grams of common salt are then added and after 15 minutes the mixture is filtered. The diazonium chloride is separated thereby as the filter cake.

6.4 grams of gamma acid of 93% purity are dissolved in about 25 grams of water to which 11 cc. of an aqueous 10% sodium carbonate solution have been added. Sufficient acetic acid is added to render the solution slightly acid to delta paper (pH range=6–7½). The filter cake of the diazonium chloride, together with 8 cc. of denatured alcohol, is then added to this solution. The coupling mixture is stirred for about 18 hours without heating, then heated to about 65° C. and agitated at this temperature for about 2 hours. The mixture is then diluted with water to a total volume of 300 cc. 50 cc. of a 10% aqueous sodium carbonate solution are added to render the mixture slightly alkaline. 50 grams of common salt are then added and the mixture agitated. After about ½ to 1½ hours, the mixture is filtered and the dyestuff separated as the filter cake and dried. The probable formula of the dyestuff is as follows:

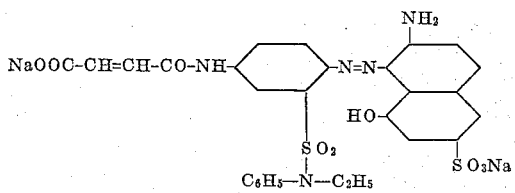

The yield is 17.5 grams, or substantially the theoretical yield based upon the quantity of the diazo component used.

The dyestuff is similar in appearance to the dyestuff of Example 1. It dyes wool in level red derivative of Example 1. The shades are fast to light.

This dyestuff and other dyestuffs containing the maleanilic acid group may be converted to the corresponding amino-succinanilic compounds by treatment of their alkali-metal salts with ammonia or primary aromatic amines, for example, methylamine, at elevated temperature and at normal or elevated pressures. The process may be conducted in aqueous solution at a temperature between 100° C. and 200° C., preferably in an autoclave.

The constitution and shade of several monoazo dyestuffs which are analogous to the dyestuff of the foregoing example, and which are produced by coupling the diazo component of the said example with coupling components other than gamma acid, are indicated in the following table:

| Coupling component | Shade |
|---|---|
| 1,8-amino-naphthol-3,6-disulfonic acid (acid coupling). | Violet. |
| 2-amino-5-naphthol-7-sulfonic acid (acid coupling). | Red. |
| 2-phenylamino-8-naphthol-6-sulfonic acid (alkaline coupling). | Reddish brown. |

*Example 3.*—4'-(2''-amino-8''-naphthol-6''-sulfonic-acid-1''-azo) phthalanilic acid-3'-sulfon(-N-ethyl-anilide)

11 grams of 4'-amino-phthalanilic acid-3'-sulfon-(N-ethyl-anilide), prepared as in Example 5 of my prior application, are dissolved in 120 cc. of an aqueous sodium carbonate solution containing about 2.2 grams of sodium carbonate. The slightly alkaline mixture is heated to 50° C. and 18 cc. of aqueous 10% sodium nitrite solution are added. The solution is poured into a mixture of 20 cc. of 20° Bé. hydrochloric acid and ice. The resulting mixture is agitated at a temperature between 0° C. and 5° C. for 2½ hours, then filtered. The diazonium chloride is separated thereby as the filter cake.

6.4 grams of gamma acid of 93% purity are dissolved in 25 grams of water to which 15 cc. of an aqueous 10% sodium carbonate solution have been added. Acetic acid is added until the solution is slightly acid to delta paper (pH range=6–7½). The temperature is adjusted to 20° C., and the filter cake of the diazo body is added, followed by 8 cc. of denatured alcohol. The mixture is stirred for about 18 hours at a temperature from 20° C. to 25° C.; then the temperature is raised to between 65° and 70° C. and agitation continued at this temperature for 2 hours. The mixture is then diluted to a total volume of 300 cc. Sufficient aqueous sodium carbonate solution is added to render the mixture slightly alkaline to Brilliant Yellow. About 50 grams of common salt are added and after agitating for about 2 hours the dyestuff is filtered out in the form of a filter cake and dried. Its probable formula is as follows:

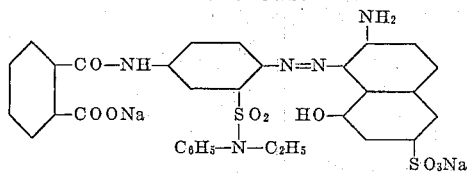

The yield is 9 grams or about 50% of the theoretical yield based on the quantity of diazo component used.

The dyestuff resembles the dyestuffs of the preceding examples in appearance, and dyes wool in level bluish-red shades which are fast to light.

I claim:

1. As a new chemical compound a mono-anilide of the formula

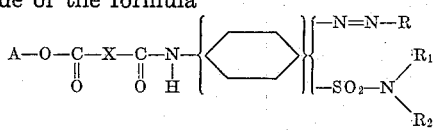

wherein A represents a member of the group consisting of hydrogen and water-soluble-salt-forming metals and groups;

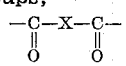

represents a divalent carbonyl radical of the group consisting of aliphatic and aromatic dicarboxylic acid residues in which X represents a carbon to carbon linkage; R represents the residue of a member of the group consisting of azo dyestuff coupling components of the benzene, naphthalene, anthracene, and pyrazolone series; and $R_1$ and $R_2$ each represents a member of the group consisting of hydrogen and alkyl, aralkyl, aryl, and cycloalkyl radicals.

2. As a new chemical compound a mono-aniline of the formula

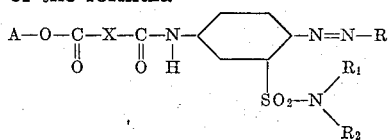

wherein A represents a member of the group consisting of hydrogen and water-soluble-salt-forming metals and groups;

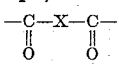

represents a divalent carbonyl radical of the group consisting of aliphatic and aromatic dicarboxylic acid residues in which X represents a carbon to carbon linkage; R represents the residue of a member of the group consisting of azo dyestuff coupling components of the benzene, naphthalene, antracene, and pyrazolone series; and $R_1$ and $R_2$ each represents a member of the group consisting of hydrogen and alkyl, aralkyl, aryl, and cycloalkyl radicals.

3. As a new chemical compound, 4-(2'-amino-8'-naphthol-6'-sulfonic acid-1'-azo)-maleanilic acid-3-sulfon-(N-ethyl-aniline) in the form of the free acid or a water-soluble salt thereof.

4. As a new chemical compound, 4-(2'-amino-8'-naphthol-6'-sulfonic acid-1'-azo)-succinanilic acid-3-sulfon-(N-ethyl-anilide) in the form of the free acid or a water-soluble salt thereof.

5. As a new chemical compound, 4'-(2''-amino-8''-naphthol-6''-sulfonic acid-1''-azo)-phthalanilic acid-3'-sulfon-(N-ethyl-anilide) in the form of the free acid or a water-soluble salt thereof.

6. The method of preparing a compound of the type defined by claim 1 which comprises diazotizing a mono-anilide of the formula

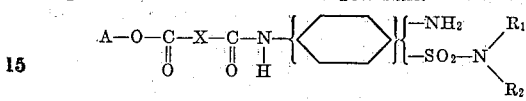

wherein A represents a member of the group consisting of hydrogen and water-soluble-salt-forming metals and groups;

$$-C-X-C-$$
$$\parallel \quad \parallel$$
$$O \quad O$$

represents a divalent carbonyl radical of the group consisting of aliphatic and aromatic dicarboxylic acid residues in which X represents a carbon to carbon linkage; and $R_1$ and $R_2$ each represents a member of the group consisting of hydrogen and alkyl, aralkyl, aryl, and cycloalkyl radicals, and coupling the resulting diazo compound with a member of the group consisting of azo dyestuff coupling components of the benzene, naphthalene, anthracene, and pyrazolone series.

7. The method of preparing a compound of the type defined by claim 2, which comprises diazotizing a mono-anilide of the formula

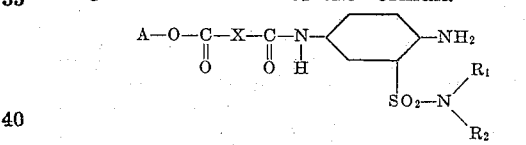

wherein A represents a member of the group consisting of hydrogen and water-soluble-salt-forming metals and groups;

$$-C-X-C-$$
$$\parallel \quad \parallel$$
$$O \quad O$$

represents a divalent carbonyl radical of the group consisting of aliphatic and aromatic dicarboxylic acid residues in which X represents a carbon to carbon linkage; and $R_1$ and $R_2$ each represents a member of the group consisting of hydrogen and alkyl, aralkyl, aryl, and cycloalkyl radicals, and coupling the resulting diazo compound with a member of the group consisting of azo dyestuff coupling components of the benzene, naphthalene, anthracene and pyrazolone series.

8. The method of preparing the compound of claim 3, which comprises diazotizing 4-amino-maleanilic acid-3-sulfon-(N-ethyl-anilide) and coupling the resulting diazo compound in acid solution with 2-amino-8-naphthol-6-sulfonic acid.

9. The method of preparing the compound of claim 4, which comprises diazotizing 4-amino-succinanilic acid-3-sulfon-(N-ethyl-anilide) and coupling the resulting diazo compound in acid solution with 2-amino-8-naphthol-6-sulfonic acid.

10. The method of preparing the compound of claim 5, which comprises diazotizing 4'-amino-phthalanilic acid-3'-sulfon-(N-ethyl-anilide) and coupling the resulting diazo compound in acid solution with 2-amino-8-naphthol-6-sulfonic acid.

CHAUNCEY ALLAN LYFORD.

CERTIFICATE OF CORRECTION.

Patent No. 2,274,717.

March 3, 1942.

CHAUNCEY ALLAN LYFORD.

It is hereby certified that error appears in the printed specification of the above numbered patent requiring correction as follows: Page 1, second column, line 2, after the semicolon and before "X" insert -- $-\overset{\text{C}}{\underset{\text{O}}{\|}}-\text{X}-\overset{\text{C}}{\underset{\text{O}}{\|}}-$ represents a divalent carbonyl radical of the group consisting of aliphatic and aromatic dicarboxylic acid residues in which--; page 4, first column, line 68, claim 2, for "antracene" read --anthracene--; line 74, claim 3, for "aniline" read --anilide--; and that the said Letters Patent should be read with this correction therein that the same may conform to the record of the case in the Patent Office.

Signed and sealed this 28th day of April, A. D. 1942.

Henry Van Arsdale,
Acting Commissioner of Patents.

(Seal)